United States Patent [19]

Winter

[11] Patent Number: 5,761,959
[45] Date of Patent: Jun. 9, 1998

[54] TRANSMISSION FOR DRIVING VEHICLE ACCESSORIES WITH FLOATING INPUT SHAFT

[76] Inventor: Vaughn Winter, 2819 Carlisle Rd., York, Pa. 17404

[21] Appl. No.: 539,373

[22] Filed: Oct. 5, 1995

[51] Int. Cl.⁶ .................. F16H 37/00; F16H 57/02
[52] U.S. Cl. .................. 74/15.66; 74/665 GA; 74/325
[58] Field of Search .............. 74/15.66, 15.86, 74/15.63, 665 GA, 325, 331; 464/158, 157, 179, 183

[56] References Cited

U.S. PATENT DOCUMENTS

| | | | |
|---|---|---|---|
| 1,453,032 | 4/1923 | Von Soden-Fraunhofen | 74/331 |
| 1,981,236 | 11/1934 | Logue | 74/331 X |
| 2,316,503 | 4/1943 | Curtis | 74/331 |
| 2,571,105 | 10/1951 | Bickel et al. | 74/15.66 X |
| 3,237,472 | 3/1966 | Perkins et al. | |
| 3,321,988 | 5/1967 | Peras | 74/325 X |
| 3,548,665 | 12/1970 | Crooks | 74/15.63 |
| 4,018,062 | 4/1977 | Bulliot | 464/158 |
| 4,061,448 | 12/1977 | Gondeck | 74/15.63 X |
| 4,129,043 | 12/1978 | Ishikawa | 74/15.63 X |
| 4,785,682 | 11/1988 | Nishimura et al. | 74/15.66 X |
| 4,807,493 | 2/1989 | Loeffler | 74/331 X |
| 5,507,704 | 4/1996 | Lasoen | 74/15.66 X |

FOREIGN PATENT DOCUMENTS

| | | | |
|---|---|---|---|
| 328 007 | 8/1989 | European Pat. Off. | 74/325 |
| 2027501 | 2/1980 | United Kingdom | 74/15.86 |
| 2107806 | 5/1983 | United Kingdom | 74/15.63 |

*Primary Examiner*—Rodney H. Bonck
*Assistant Examiner*—Mary Ann Battista
*Attorney, Agent, or Firm*—Aquilino & Welsh

[57] ABSTRACT

A vehicle transmission which functions as a drive system for the vehicle accessories necessary for continuous operation of the vehicle's engine. The transmission includes a main shaft which is continuously rotated by an input shaft. Mounted on the main drive shaft is a main drive gear, which meshes with an accessory drive gear and a cluster gear assembly. The accessory drive gear in turn is coupled to an accessory shaft which functions to power a plurality of pumps mounted to the transmission. The cluster gear assembly in combination with a sliding gear assembly functions to start the vehicle moving in forward or reverse. The transmission being self contained within a casing such that the transmission can be mounted at any selected distance from the engine of the vehicle. Further, the input shaft may float back and forth within a hollow main shaft as it is not supported by bearings, which allows for misalignment between the engine crank shaft and the transmission.

14 Claims, 4 Drawing Sheets

TRANSMISSION FOR DRIVING VEHICLE ACCESSORIES WITH FLOATING INPUT SHAFT

BACKGROUND OF THE INVENTION

1. Field of the Invention

The invention relates to transmissions for vehicles. More particularly, the invention relates to an accessory drive system which is part of a transmission. The accessory drive system includes an accessory drive gear and shaft which are continuously driven by a main shaft of the transmission, which is coupled to an input shaft. The input shaft is connected to the engine crank shaft thus, when the engine is running the system permits any and all vehicle accessories such as the distributor, oil pump, power steering pump, fuel pump, coolant pump, etc. to be continuously driven while the engine is operating. The input shaft being of a unique floating design.

2. Description of the Prior Art

A common problem within the race car industry is that necessary vehicle accessories in order to sustain the life and durability of an engine, such as oil pumps, fail and thus expensive engines are lost. At racing engine speeds (8,000–10,000 RPM), accessories driven off of the engine are mounted thereto and are generally belt driven which often break or come off, thus causing the accessory to fail and the engine to be destroyed. Belt breakage may be caused by the high speeds or dirt and stones picked up off the race track, whereas belts may slip off due to the gyroscopic forces as the belt and vehicle turn.

Another problem in this industry is that the alignment between the engine and transmission is critical to the life and performance of the drive train which requires precision machining at the factory in order to insure proper alignment between these drive train components. In this industry, however, engines are machined at different shops all around the country and thus tolerances between the direct connection of an engine to a transmission vary.

Vehicles used in the circular track racing industry utilize three speed transmissions. A high speed direct drive gear and a low speed gear assembly are used to go forward, while a single speed gear assembly is used to go in reverse. Recently, a transmission was developed wherein the clutch used to engage the low gear and the reverse gear was positioned within the transmission casing. Further details can be found in U.S. Pat. No. 4,532,821 to Hager, which is hereby incorporated by reference.

In view of the shortcomings of the prior art relating to driving vehicle accessories and relating to drive train connection tolerances, applicant developed the present direct drive accessory transmission with a floating input shaft option.

SUMMARY OF THE INVENTION

The present invention relates to a vehicle transmission which functions as a drive system for the vehicle accessories necessary for continuous operation of the vehicle's engine. The transmission includes a main shaft coupled to an input shaft driven by the engine crank shaft, wherein all of the shafts are continuously rotated while the engine is operating. Mounted on the main drive shaft is a main drive gear, which meshes with an accessory drive gear and a cluster gear assembly. The accessory drive gear in turn is coupled to an accessory shaft which functions to power a plurality of pumps mounted to the transmission. The cluster gear assembly in combination with a sliding gear assembly function to start the vehicle moving in forward or reverse. The transmission is self contained within a casing to permit the transmission to be mounted at any selected distance from the engine of the vehicle. Further, the input shaft may float back and forth within the main shaft as it is not supported by bearings, thus allowing for misalignment between the engine crank shaft and the transmission. The floating shaft design is used when the engine is directly connected to the transmission.

It is, therefore, an object of the present invention to provide a transmission design in which an accessory drive gear is in engagement with a constantly rotated main transmission shaft, thereby providing an accessory drive which is always rotating while the engine is running.

Another object of the present invention is to provide a transmission in which numerous vehicle accessories could be mounted thereto and driven by an accessory drive gear and shaft, instead of using unreliable rubber belts.

Still another object of the present invention is to provide a transmission which will eliminate the need for a conventional clutch and flywheel assembly, thereby allowing the transmission to be located away from the engine and closer to the drive wheels. The relocation of the transmission and accessories mounted thereto concentrates more weight closer to the drive wheels to increase performance.

Another objective is to provide a transmission upon which vehicle accessories may be mounted. This eliminates the mounting of accessories to the engine and thus makes engine replacement easier. In addition, accessory life is extended because there is less vibration and heat associated with a transmission than with an engine.

Yet another object of the present invention is to provide a transmission which is self contained and thus can be mounted independently (hung in the frame/supported by the chassis) and connected to the engine by a drive shaft with or without universal joints at one or both ends of this drive shaft. The versatile mounting capabilities of the present transmission permit the transmission to be positioned in the center of the drive line by mounting a short drive shaft to the front of the transmission and a short drive shaft to the rear of the transmission. This eliminates the need for long drive shafts and long extension housings.

Another object of the invention is to provide a floating input shaft to allow for misalignment between the engine and transmission when they are directly connected to one another, thereby eliminating the need for precision machining.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 2:
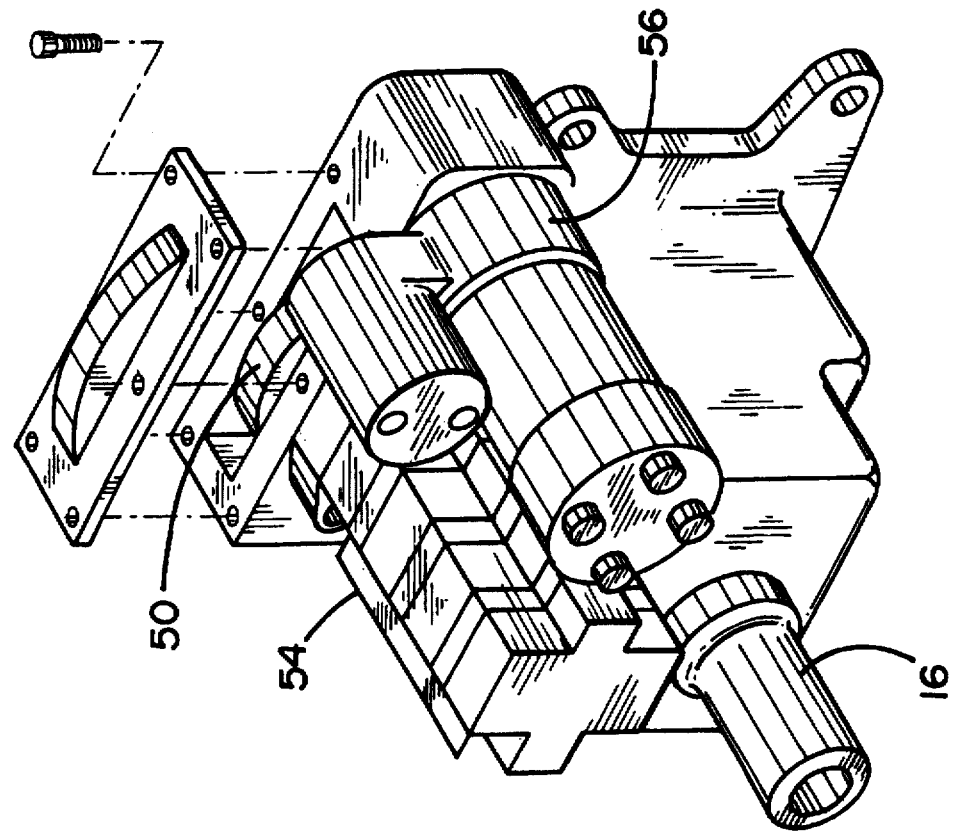
FIG. 2 is a rear perspective view of the transmission of the present invention.
Figure 1:
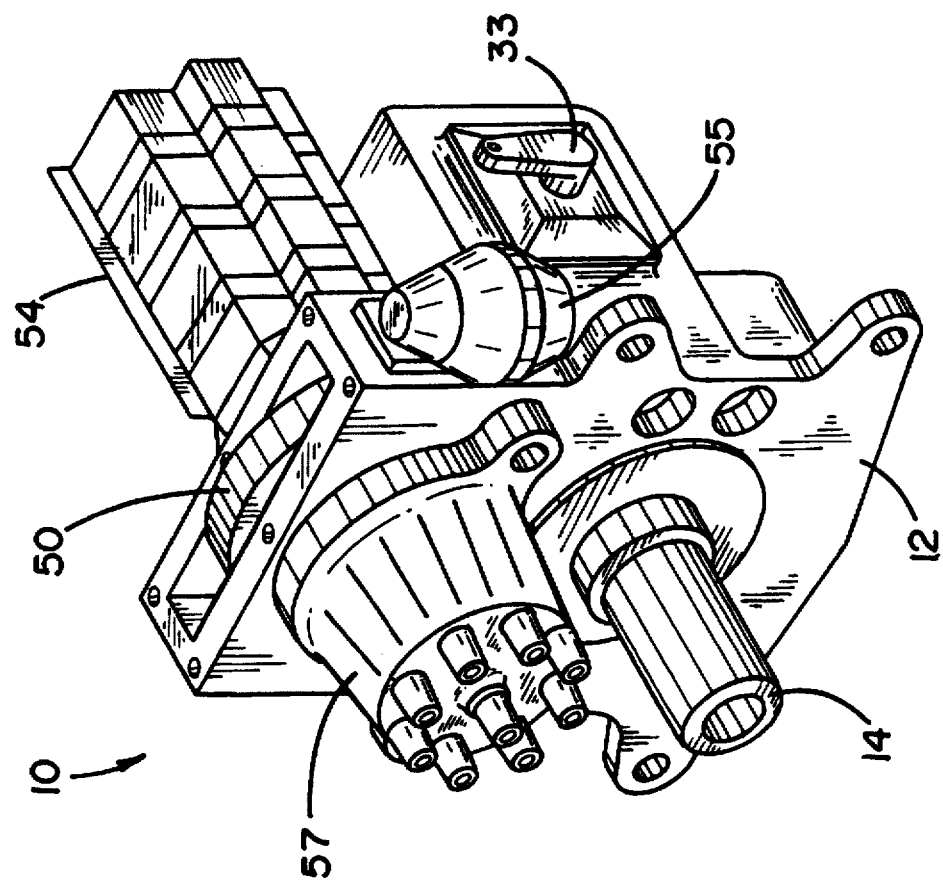
FIG. 1 is a front perspective view of the transmission of the present invention.
Figure 3:
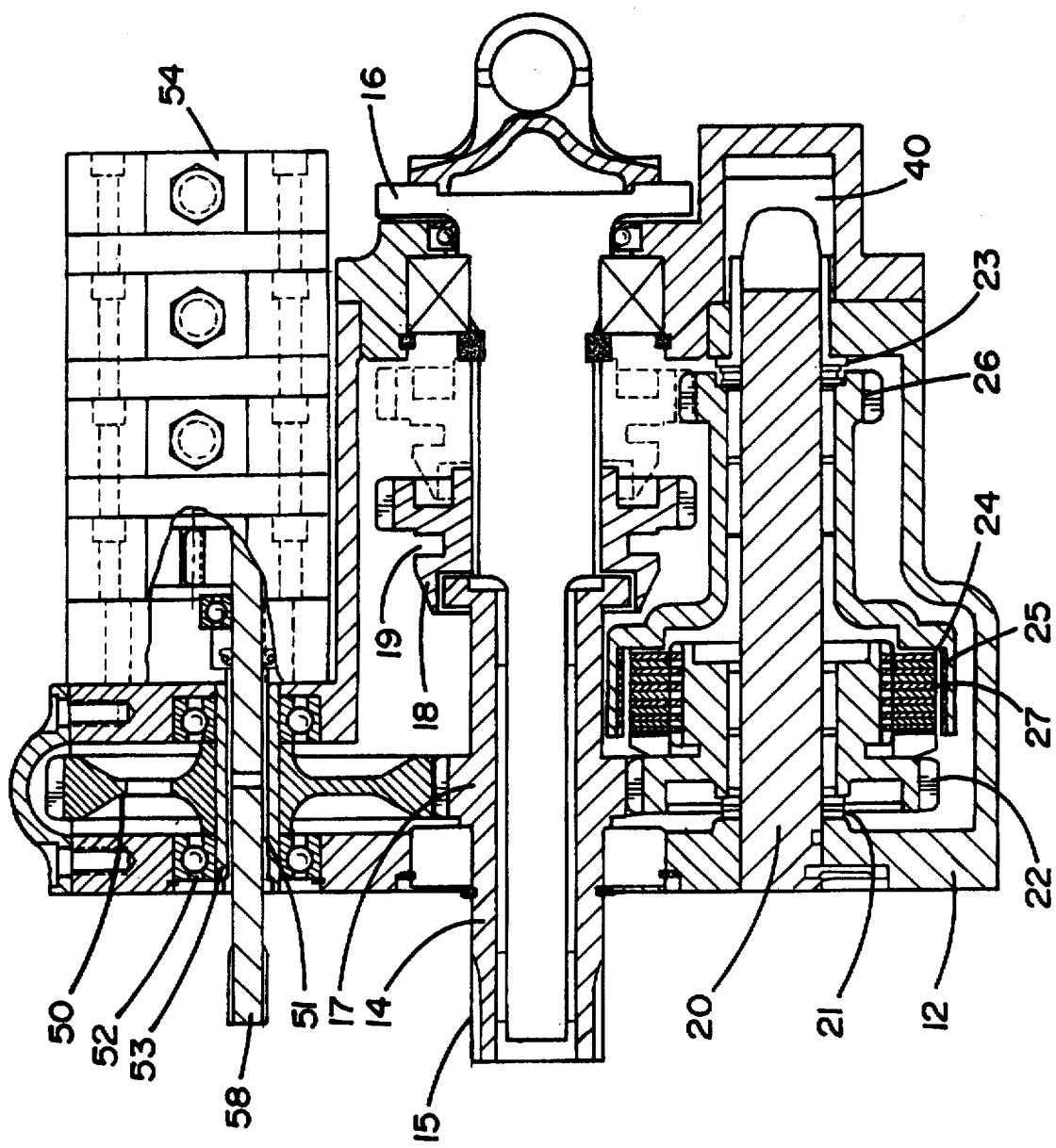
FIG. 3 is a cross-sectional side view of the transmission embodied in the present invention.
Figure 4:
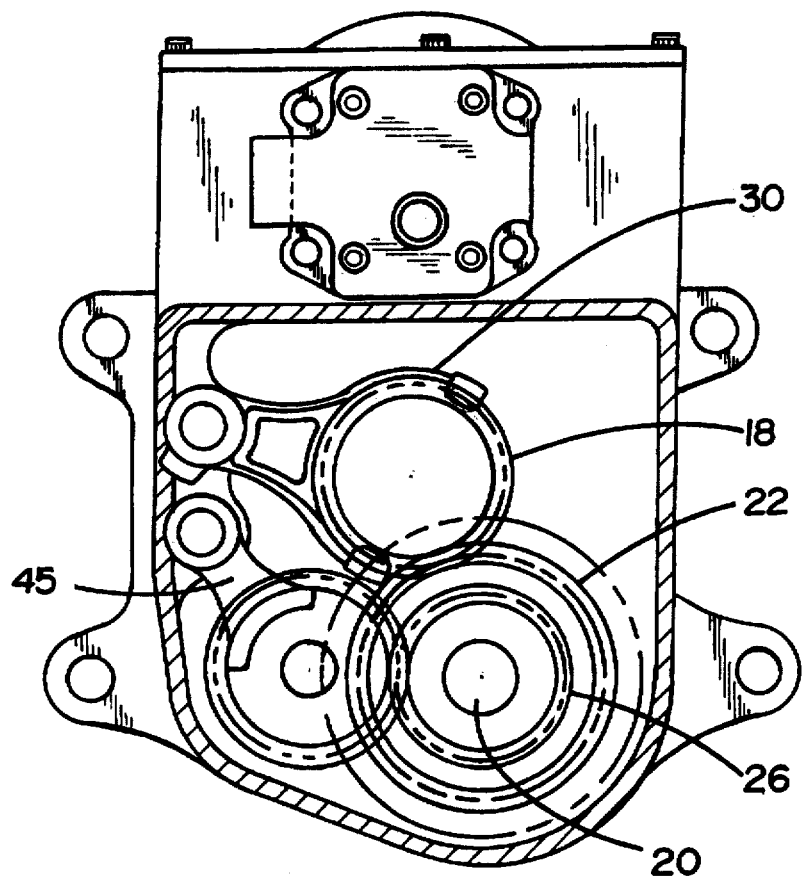
FIG. 4 is a cross-sectional end view of the transmission embodied in FIG. 3.

With reference to FIG. 1, a automobile transmission 10 is disclosed. The transmission 10 is specifically designed for vehicles used in the circle track racing industry, however, it may be used for any motorized vehicle. As previously discussed, these racing vehicles rely upon three speed transmissions: one, a high or direct drive wherein the transmission output shaft rotates at the same speed as the engine crank shaft via a main or input shaft; two, a low gear used to start the vehicle moving forward; and three a reverse gear used to start the vehicle moving in reverse.

The transmission 10 includes a casing 12 which houses a main or input shaft 14 adapted to be connected to the engine crank shaft via splines 15 on the end of main shaft 14. The main shaft 14 transmits power to an output shaft 16 via a sliding gear assembly 18 which has three positions. One, a forward high gear position wherein the sliding gear assembly 18 connects the main shaft 14 directly to output shaft 16. That is, the engine crank shaft, the main shaft and the output shaft all rotate at the same speed. Two, a rearward low gear position (shown in dotted lines), which is used to start forward movement of the vehicle from an at rest position. Three, a neutral position located between the high and low gear positions. The sliding gear assembly 18 is moved back and forth from high to low through neutral via a shift fork 30 connected to a manual shifter 33.

The transmission is further provided with a fixed counter shaft 20 housed within the casing 12 parallel to the main shaft 14. Mounted about the counter shaft 20 is a drive gear cluster 22, a clutch pack 24 and a driven gear 26, which are supported by stationary bearings 21 and sliding bearings 23. The drive gear cluster 22 is connected to the main shaft 14 via main drive gear 17 and thus always rotates when the engine is running. A hydraulic piston arrangement 40 is positioned at the end of counter shaft 20. The piston 40 functions to push driven gear 26 and sliding bearing 23 forward, which in turn applies pressure to clutch pack 24, thereby intermeshing a plurality of annular clutch plates 25 with annular pressure plates 27 such that the driven gear 26 is caused to rotate.

When it is desired to start the vehicle moving forward, the sliding gear assembly 18 is slid into the rearward low gear position. This is accomplished by a manual shifter 33 and a linkage system (not shown) which is coupled to shift fork 30, which in turn engages slot 19 in sliding gear assembly in order to move it rearward into engagement with driven gear 26. Driven gear 26 is caused to rotate when a clutch pedal within the vehicle is depressed thereby hydraulically activating piston 40, the operation of which was previously discussed.

Figure 5:
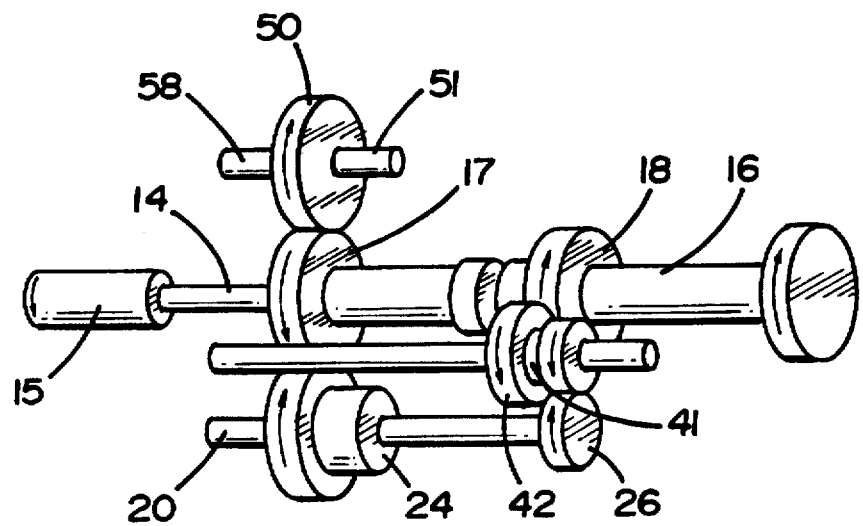
FIG. 5 is schematic view showing the operation of the shaft and gearing rotation of the present invention.

When it is desired to start the vehicle moving in reverse, the sliding gear assembly 18 is placed into the neutral position between high and low gear positions. The reverse idler gear 42, best shown in FIG. 5, is then slid into engagement with both the driven gear 26 and the sliding gear 18 via reverse shift fork 45 which engages slot 41 in reverse idler gear 42. The direction of output shaft 16 is thus reversed with respect to the direction of rotation of the main shaft 14 due to the opposed gear patterns on idler gear 42.

The main drive gear 17 is also in constant engagement with an accessory drive gear 50 as they are meshed together. The accessory drive gear 50 in turn can drive an accessory drive shaft 51, which can operate a plurality of aligned pumps 54 or it could be splined to another gear or coupled via a chain belt to any desired accessory. The accessory drive gear 50 and the accessory drive shaft 51 are supported within the casing by bearings 52 and a shaft 53, which may be hollow. The accessory drive gear or shaft functions to transmit power to any vehicle accessory normally being driven by the engine, that is, those accessories which are required to maintain the engine running. For example, the oil pump, water pump, fuel pump, distributor, tach drive, ignition, timer, magneto, generator, starter, and alternator. The accessory drive also provides the power necessary to drive the circulator pump, power steering pump, differential pump, engine oil pump, transmission pump, cooler pump, fuel pump, coolant pump, and scavenger pump.

A fuel pump 55 is shown mounted directly to the transmission casing 12 and is coupled directly to one side of the accessory drive gear 50. A generator/starter/alternator combination 56 is shown mounted directly to the transmission housing and coupled directly to an opposite side of the accessory drive gear 50. A distributor 57 is mounted to casing 12 so as to be axially aligned and operatively connected to an accessory drive shaft 58 extending forward from and connected to the accessory drive gear 50. A plurality of aligned pumps 54 are mounted to casing 12 so as to be axially aligned with an accessory drive shaft 51 extending rearward from and connected to the accessory drive gear 50.

The addition of the accessories to the transmission permits vehicles to overcome the problems associated with the unreliability of belt drives at racing speeds of 8,000 to 10,000 RPMs. Additionally, moving the accessories from the engine generally located near the front of the vehicle to the transmission, which is rearward of the engine, functions to take weight off the steering wheels, while applying additional weight to the rear drive wheels where the weight becomes a benefit.

The transmission is manufactured to be mounted independently (hung in the frame/supported by the chassis) and connected to the engine by a drive shaft with or without universal joints at one or both ends of the drive shaft. This allows the transmission to be located anywhere along the length of the chassis, which allows the weight of both the transmission and accessories to be moved further back along the chassis to further improve handling and performance. The versatile mounting capabilities of the present transmission also permit the transmission to be positioned in the center of the drive line by mounting a short drive shaft to the front of the transmission and a short drive shaft to the rear of the transmission. This eliminates the need for long drive shafts and long extension housings. In fact, drive shaft lengths are very critical in race cars, as the longer drive shafts are more prone to vibration and consequently they soak up more power. The vibration also causes degradation of the drive shafts and the parts to which the drive shafts are attached. Since the component parts are self contained within said casing the transmission can be mounted at any selected distance from the engine of the vehicle.

Figure 6:
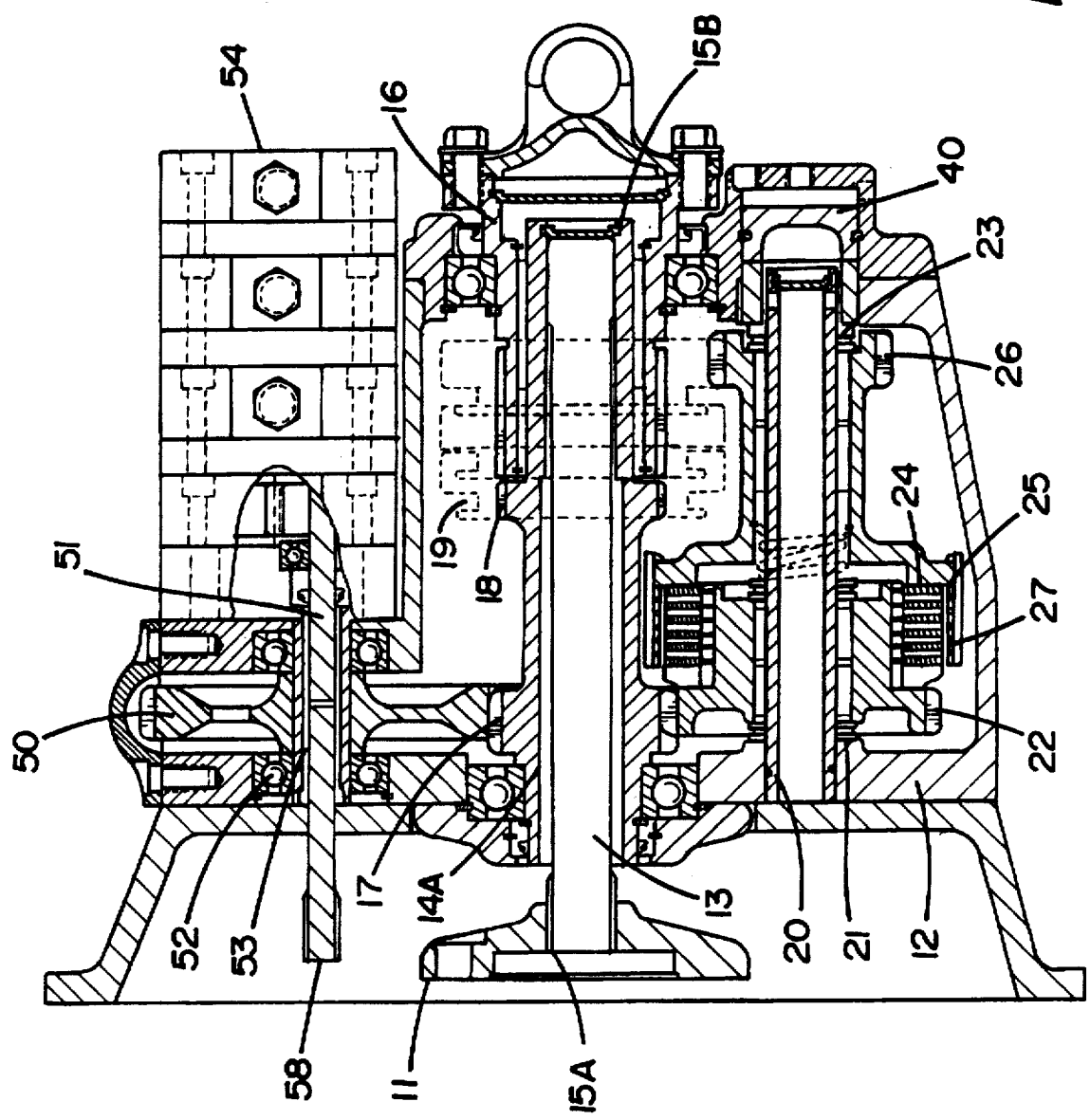
FIG. 6 is a cross-sectional side view of the transmission embodied in the present invention including a floating input shaft.

While it may be advantageous to mount the transmission independently from the engine, in many instances this may not be possible or desired. Turning to FIG. 6, an embodiment of the present transmission 10 is shown with a floating input shaft 13. Input shaft 13 is externally splined on both ends, as indicated by numeral 15A and 15B. On the crank shaft end 15A the splines are coupled to an internally splined solid drive flange 11 which in turn is bolted to the engine crank shaft (not shown). On the other end 15B the splines are coupled to internal splines within main shaft 14A. Main shaft 14A is hollow in order to allow input shaft 13 to fit therein. The hollow main shaft is another novel aspect of the present invention as it permits an input shaft to fit therein. Further, it is lighter than a solid shaft, thereby lowering the overall vehicle weight and the rotating weight. Input shaft 13 is adequately supported within main shaft 14A via the splined connection at 15B. Therefore, no bearings between the outside diameter of the input shaft and inside diameter of the main shaft are necessary.

Additionally, main shaft 14A and input shaft 13 run from front to almost the rear of the transmission. This arrangement not only assists the rear output shaft bearings in supporting the output shaft 16, but also keeps the main drive shaft 14A and the output shaft 16 in alignment. The alignment is critical to smooth shifting into high or direct drive since the sliding gear must engage both the output shaft 16 and main shaft 14A at the same time, while rotating at high speeds in order to lock these two shafts together so they may turn as one. The smallest amount of misalignment can cause hard shifting and may also cause the sliding gear 18 to work itself out of engagement with the output shaft 16, unless held in place by other means. When alignment is perfect, the tendency of the sliding gear to work itself out of engagement no longer exist. The accurate alignment and added stability this design provides is very beneficial, especially when a short stub output shaft is used as it functions as an addition bearing.

Due to the splined connections, input shaft 13 may move or float back and forth and adjusted for slight angular misalignment between drive train component parts.

As previously indicated the input shaft runs from the front to the rear of the transmission, thus it is long enough to function as a torsional dampener. This is important since the transmission of the present invention eliminates the need for a flywheel, clutch and pressure plate assembly at the output end of an engine. While it is not desirable to have a heavy flywheel in the racing industry, the flywheel does function as an effective torsional dampener, that is it functions to smooth the erratic rotation of the crank shaft. The erratic rotation being caused by the fact that only four pistons firing every 360 degrees on an 8-cylinder engine. This erratic rotation causes destructive harmonics and vibration on the entire drive train and if left unchecked will destroy many parts.

In addition to the long input shaft, a solid drive flange 11 is splined to input shaft 13 which increases the overall weight of the input shaft, thereby enhancing its ability to serve as a torsional dampener. Input shaft 13 acts much like a torsion bar to soak up the roughness created by the erratic rotation and thus minimizes the destructive vibration of the crank shaft before it reaches the transmission.

As a result of the present transmission, the need to install a flywheel and/or bell housing is eliminated. The need is eliminated, since the transmission no longer needs to be bolted to the engine via the bell housing. The flywheel is no longer needed because there is no clutch to be bolted to the flywheel, and no starter to be bolted to the bell housing. As a result, neither a ring gear nor a flywheel is needed since the starter is now an accessory driven by and mounted on the transmission. Further, positioning the clutch within the transmission casing results in the saving of a great deal of power. The conventional rotating clutch pressure plate and flywheel combination is very heavy and thus requires energy to accelerate the combination when a vehicle is coming out of a turn and energy to slow the rotating clutch power plate and the flywheel when the vehicle is approaching a turn.

The present transmission provides another advantage by moving the distributor to the transmission. This provides a significant performance advantage, since distributors are generally driven off the rear of the camshaft. The cam itself is driven off the crankshaft at the front of the engine and the lobes of the camshaft open the valves at very radical lift rates opposing very high valve spring pressures. It is, therefore, theorized that the camshaft winds up and unwinds very much like a torsion bar because of the extreme uneven loads of the valves opening and closing. Since the cam is driven at the front of the engine and the distributor is driven off the rear of the cam at the back of the engine, any torsional twisting of the cam will cause a variation of spark timing between the cylinders by as much as ⅔ degrees. No such variation occurs in the present direct drive accessory transmission.

While various preferred embodiments have been shown and described, it will be understood that there is no intent to limit the invention by such disclosure, but rather, is intended to cover all modifications and alternate constructions falling within the spirit and scope of the invention as defined in the appended claims.

I claim:

1. A vehicle transmission, comprising:
    an exterior casing which houses, a main shaft, an output shaft, a floating input shaft and a sliding gear for selectively coupling the main shaft to the output shaft;
    the main shaft, the output shaft and the sliding gear all being coaxial and the sliding gear traveling laterally along the main shaft and the output shaft;
    a main drive gear connected to said main shaft;
    an accessory drive gear coupled to said main drive gear to continuously power accessories for a vehicle directly from the transmission housed with said casing; and,
    wherein said main shaft is hollow and receives the input shaft therein and is coupled to said input shaft by a splined connection.

2. The vehicle transmission as set forth in claim 1, further including an accessory drive shaft which is coupled to said accessory drive gear and at least one vehicle accessory mounted to the transmission in line with said accessory drive shaft in order to be driven thereby.

3. The vehicle transmission as set forth in claim 2, wherein said at least one accessory is a pump.

4. The vehicle transmission as set forth in claim 2, wherein said at least one accessory is a distributor.

5. The vehicle transmission as set forth in claim 1, wherein the accessory drive gear is coupled to a distributor.

6. The vehicle transmission as set forth in claim 1, wherein the accessory drive gear is coupled to a pump.

7. The vehicle transmission as set forth in claim 1, further including at least one vehicle accessory mounted to the casing.

8. The vehicle transmission as set forth in claim 1, wherein the accessory drive gear is directly coupled to a starter.

9. The vehicle transmission as set forth in claim 8, wherein the starter is mounted to the transmission casing to the side of said accessory drive gear.

10. A vehicle transmission, comprising:

an exterior casing which houses, a main shaft, an output shaft, a floating input shaft and a sliding gear for selectively coupling the main shaft to the output shaft;

a main drive gear connected to said main shaft;

an accessory drive gear coupled to said main drive gear to continuously power accessories for a vehicle directly from the transmission housed with said casing; and, wherein said main shaft is hollow and receives the input shaft therein and is coupled to said input shaft by a splined connection.

11. A vehicle transmission, comprising:

an exterior casing which houses, a floating input shaft, an output shaft, a main shaft and an internal clutch for selectively coupling the input shaft to the output shaft;

wherein said main shaft is hollow and receives the input shaft therein and is coupled to said input shaft.

12. The vehicle transmission as set forth in claim 11, wherein the input shaft has first and second ends which are splined and wherein said first end is coupled to a drive flange adapted to be bolted to a crank shaft.

13. The vehicle transmission as set forth in claim 12, wherein the second end is coupled to said main shaft via internal splines on said main shaft.

14. The vehicle transmission as set forth in claim 11, wherein a main drive gear is connected to said main shaft and, the casing further housing an accessory drive gear coupled to said main drive gear to continuously power accessories for a vehicle directly from the transmission.

* * * * *